US012802454B2

(12) United States Patent
Kim et al.

(10) Patent No.: US 12,802,454 B2
(45) Date of Patent: Nov. 17, 2026

(54) VARIABLE-TYPE 3D AVM SYSTEM BY USE OF DEEP LEARNING

(71) Applicants: Seong Chan Kim, Seongnam-si (KR); Jin Bok Kim, Seongnam-si (KR); In Sub Lee, Seongnam-si (KR)

(72) Inventors: Seong Chan Kim, Seongnam-si (KR); Jin Bok Kim, Seongnam-si (KR); In Sub Lee, Seongnam-si (KR)

(73) Assignee: LITBIG INC., Seongnam-si (KR)

( * ) Notice: Subject to any disclaimer, the term of this patent is extended or adjusted under 35 U.S.C. 154(b) by 187 days.

(21) Appl. No.: 18/825,902

(22) Filed: Sep. 5, 2024

(65) Prior Publication Data

US 2025/0124715 A1 Apr. 17, 2025

(30) Foreign Application Priority Data

Oct. 13, 2023 (KR) ........................ 10-2023-0136315

(51) Int. Cl.

| | |
|---|---|
| ***G06V 20/56*** | (2022.01) |
| ***G06T 7/10*** | (2017.01) |
| ***G06T 7/80*** | (2017.01) |
| ***G06V 10/26*** | (2022.01) |
| ***G06V 10/40*** | (2022.01) |
| ***G06V 10/82*** | (2022.01) |

(52) U.S. Cl.

CPC ................ *G06V 20/56* (2022.01); *G06T 7/10* (2017.01); *G06T 7/80* (2017.01); *G06V 10/26* (2022.01); *G06V 10/40* (2022.01); *G06V 10/82* (2022.01); *G06T 2207/10016* (2013.01); *G06T 2207/20081* (2013.01); *G06T 2207/20084* (2013.01); *G06T 2207/20112* (2013.01); *G06T 2207/30252* (2013.01)

(58) Field of Classification Search

None

See application file for complete search history.

(56) References Cited

U.S. PATENT DOCUMENTS

| | | | | |
|---|---|---|---|---|
| 10,803,325 B2 * | 10/2020 | Bai | ........................... | G06N 3/08 |
| 11,080,537 B2 * | 8/2021 | Bai | ........................ | G06V 10/82 |
| 11,117,570 B1 * | 9/2021 | Broggi | ................. | G06V 20/586 |
| 2019/0271550 A1 * | 9/2019 | Breed | ................ | G01C 21/3811 |
| 2021/0245701 A1 * | 8/2021 | Haltom | .................. | G06V 40/10 |
| 2023/0037767 A1 * | 2/2023 | Yang | ...................... | G08G 1/167 |

(Continued)

FOREIGN PATENT DOCUMENTS

| | | |
|---|---|---|
| KR | 10-2017-0111504 A | 10/2017 |
| KR | 10-2018-0001869 A | 1/2018 |

(Continued)

*Primary Examiner* — Soo Shin

(74) *Attorney, Agent, or Firm* — LOZA & LOZA, LLP; John K. Park

(57) ABSTRACT

The present invention generally relates to a 3D around view monitoring (3D AVM) technology for a vehicle. In particular, the invention relates to a technology enabling a distortion-free 3D AVM image plane to be formed by estimating a terrain characteristic from camera videos by using a deep-learning neural network model in an edge-cloud environment and making and utilizing a 3D map. The invention has an advantage of enhancing the convenience of driving a vehicle by forming a 3D AVM image plane from which a terrain distortion is eliminated.

3 Claims, 6 Drawing Sheets

(Multi-Channel Camera Videos)

(2D AVM)

(56) References Cited

U.S. PATENT DOCUMENTS

| | | | | |
|---|---|---|---|---|
| 2023/0109473 A1* | 4/2023 | Han | H04N 23/90 | 348/135 |
| 2023/0319218 A1* | 10/2023 | Ren | G06T 3/4038 | 382/284 |

FOREIGN PATENT DOCUMENTS

| | | | |
|---|---|---|---|
| KR | 10-2020-0126365 | A | 11/2020 |
| KR | 10-2314864 | B1 | 10/2021 |
| KR | 10-2022-0113781 | A | 8/2022 |
| KR | 10-2022-0123862 | A | 9/2022 |
| KR | 10-2469815 | B1 | 11/2022 |

* cited by examiner (Multi-Channel Camera Videos)

(2D AVM)

(a)

(b)

(c)

(a)

(b)

(c)

VARIABLE-TYPE 3D AVM SYSTEM BY USE OF DEEP LEARNING

BACKGROUND OF THE INVENTION

Field of the Invention

The present invention generally relates to a 3D around view monitoring (3D AVM) technology for a vehicle.

In particular, the invention relates to a technology enabling a distortion-free 3D AVM image plane to be formed by estimating a terrain characteristic from camera videos by using a deep-learning neural network model in an edge-cloud environment and making and utilizing a 3D map.

Description of the Related Art

In recent years, there has been a trend to introduce around view monitoring (AVM) systems in vehicles. Around view monitoring (AVM), also known as surround view monitoring (SVM), is a technology enabling a top view centered on a vehicle to be provided by installing cameras on front, rear, right, and left sides of the vehicle, imaging front, rear, right, and left sides around the vehicle, and then combining camera videos. Drivers can understand situations around vehicles, respectively, as if the drivers are looking down from above the vehicles, thus making it convenient to drive or park.

FIG. 1 is a conceptual view of general 2D AVM video processing.

Cameras are mounted on front and rear sides of a vehicle, as well as both right and left sides thereof, and camera videos provided from these cameras are subjected to distortion correction to be made into respective flat images, and then a top-view-like around view video is obtained through stitching (image alignment and composition) processing by applying projections obtained by estimating camera postures. This around view video is provided to a driver on a vehicle interior monitor.

While 2D AVM provides a top view as described above, 3D AVM provides an image plane from a three-dimensional (3D) viewpoint. Since the viewpoint is converted to a three dimension, the driver can accurately understand a situation around the vehicle, as compared to an existing AVM.

FIG. 2 is a conceptual view of general 3D AVM video processing.

In the 3D AVM, the driver is provided with a composite video obtained by projecting camera videos on a cylinder-shaped or bowl-shaped 3D projection plane. FIG. 2 illustrates an example using a bowl-shaped 3D projection plane.

A disadvantage of the 3D AVM in the related art is that camera videos are projected onto a fixed 3D projection plane having a preset shape (for example, a cylindrical or bowl shape), and thus shapes of an object and a terrain feature are distorted with respect to various places (environments).

FIG. 3 is an illustrative view of a 3D AVM image plane in the related art to which a fixed 3D projection plane is applied.

In FIG. 3, (a) to (c) are 3D AVM videos generated using a fixed 3D projection plane having an oval bowl shape. Observation of these 3D AVM videos makes it possible to confirm that actual terrain features around the vehicle on a narrow road and underground and above-ground parking lots are not accurately reflected on the 3D AVM image plane. For the sake of simplicity of description, this is referred to as "terrain distortion" in this specification. In this manner, a 3D AVM video with terrain distortion may lead the driver to make inappropriate determination.

SUMMARY OF THE INVENTION

An object of the invention is to provide a 3D around view monitoring (3D AVM) technology for a vehicle in general.

In particular, an object of the invention is to provide a technology enabling a distortion-free 3D AVM image plane to be formed by estimating a terrain characteristic from a camera video by using a deep-learning neural network model in an edge-cloud environment and making and utilizing a 3D map.

In order to achieve the object, a variable-type 3D AVM system by use of deep learning in an edge-cloud environment according to the invention may include: a plurality of cameras that are installed in a vehicle in different directions to generate a plurality of camera videos; a deep-learning neural network model unit that includes a pre-trained deep-learning neural network model to estimate terrain characteristic information for an image frame and generates a plurality of terrain maps having terrain characteristic information of corresponding camera videos by the deep-learning neural network model when the plurality of camera videos are received from the plurality of cameras; a deep-learning neural network cloud unit that trains the deep-learning neural network model to estimate terrain characteristic information for an image frame by using a pre-provided training dataset; an edge communication unit that downloads and receives, via a network, the deep-learning neural network model trained by the deep-learning neural network cloud unit; and a 3D AVM video combining unit that receives the plurality of camera videos from the plurality of cameras, receives the plurality of terrain maps from the deep-learning neural network model unit, applies an atypical projection to the plurality of camera videos in response to terrain characteristic information contained in the terrain maps, performs video combination, and generates a 3D AVM video.

DESCRIPTION OF SPECIFIC EMBODIMENTS

Hereinafter, the invention will be described with reference to the accompanying drawings.

Figure 1:
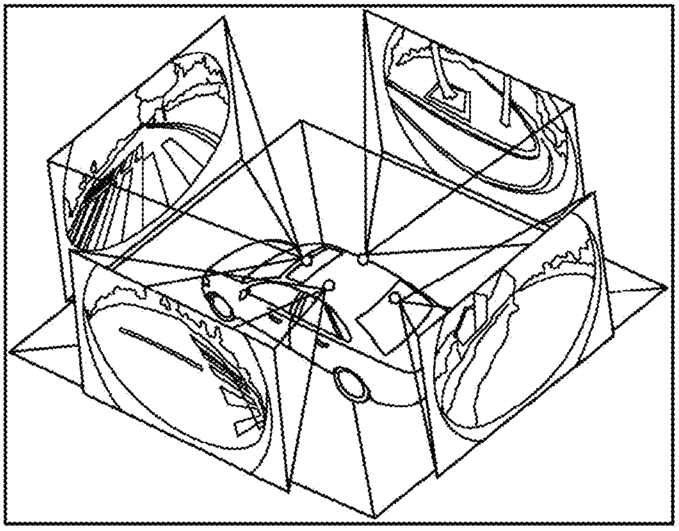
FIG. 1 is a conceptual view of general 2D AVM video processing.
Figure 1:
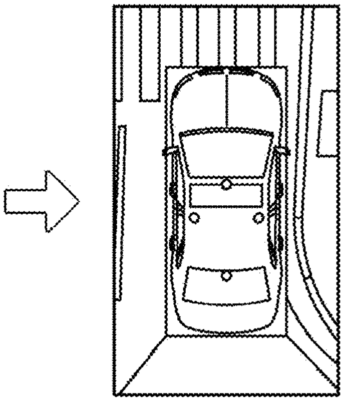
Figure 2:
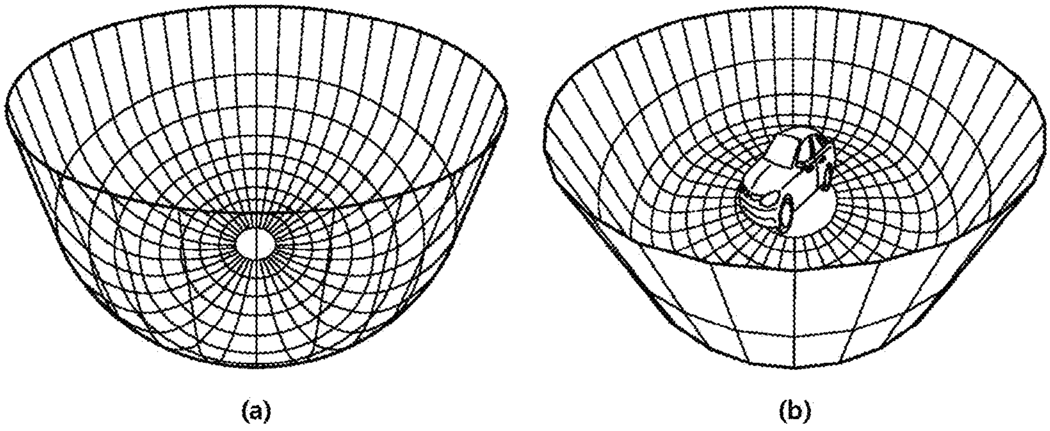
FIG. 2 is a conceptual view of general 3D AVM video processing.
Figure 3:
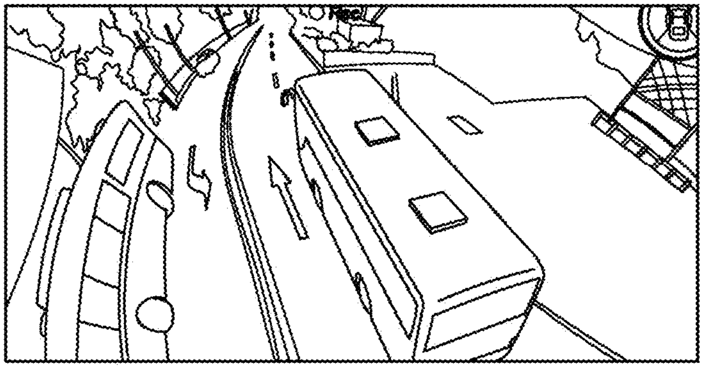
FIG. 3 is an illustrative view of a 3D AVM image plane in the related art to which a fixed 3D projection plane is applied.
Figure 3:
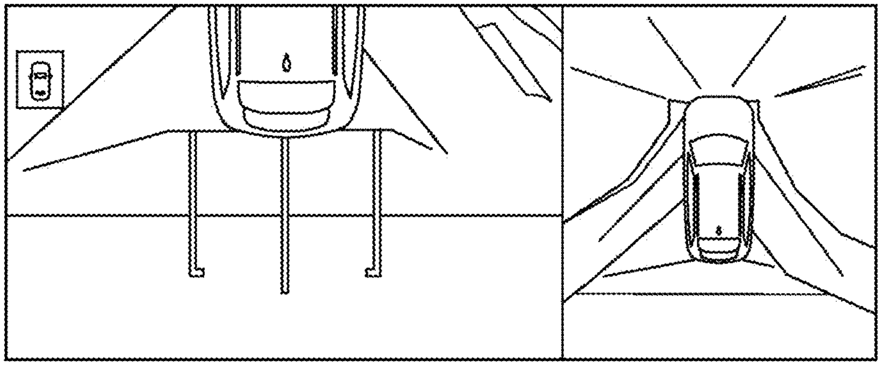
Figure 3:
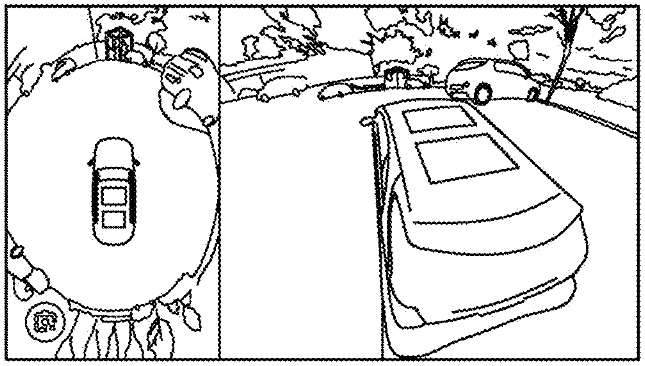
Figure 4:
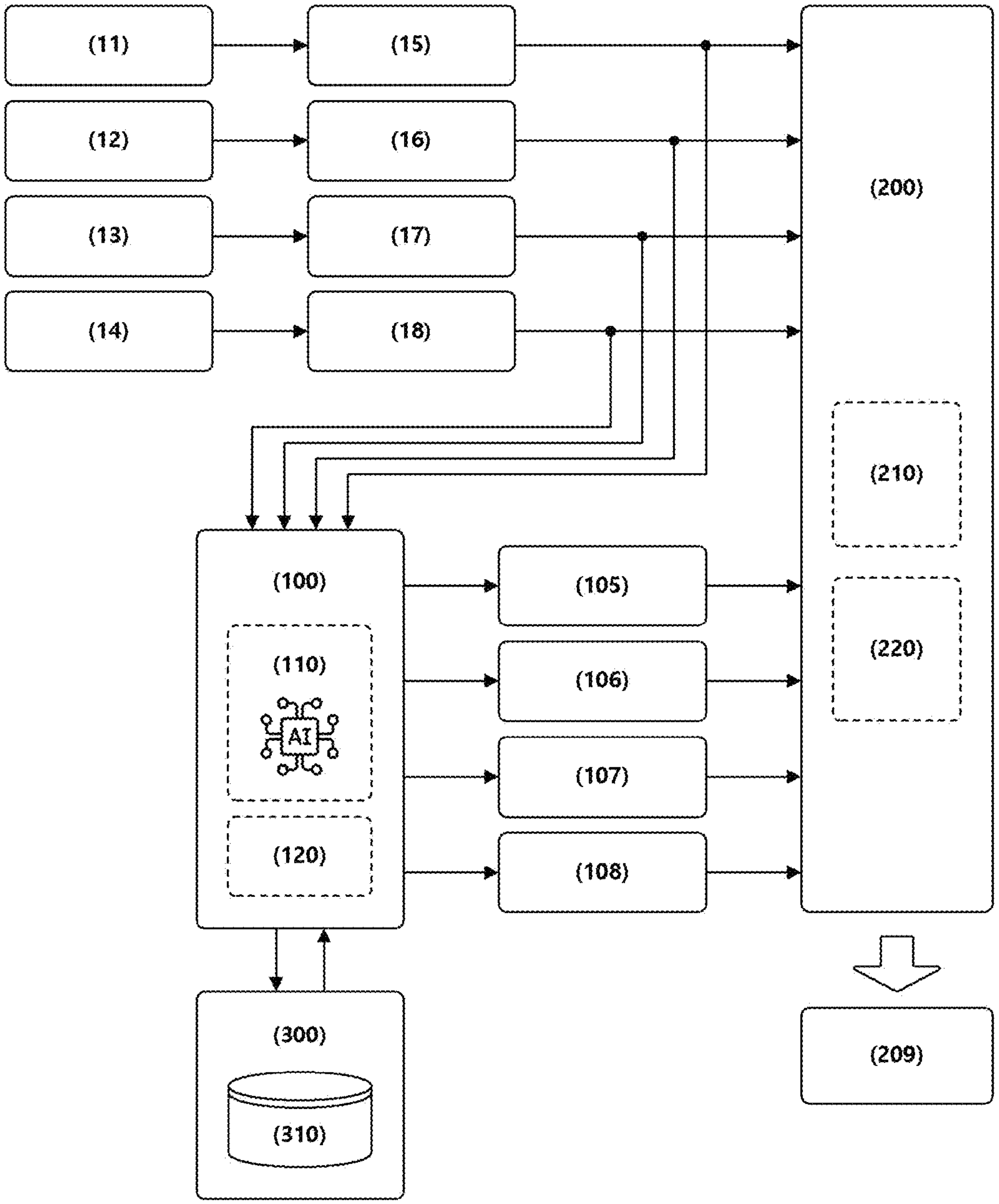
FIG. 4 is a block diagram of an overall configuration of a 3D AVM system according to the invention.

FIG. 4 is a block diagram illustrating an overall configuration of a variable-type 3D AVM system by use of deep learning in an edge-cloud environment according to the invention.

With reference to FIG. 4, the 3D AVM system according to the invention includes of a plurality of cameras 11 to 14, a deep-learning neural network processing unit 100, a 3D AVM video combining unit 200, and a deep-learning neural network cloud unit 300.

The plurality of cameras 11 to 14 are installed in a vehicle in different directions to image surroundings of the cameras and generate a plurality of camera videos 15 to 18. These camera videos 15 to 18 are transmitted to the deep-learning neural network processing unit and the 3D AVM video combining unit 200.

The deep-learning neural network processing unit generates terrain maps 105 to 108 from the camera videos 15 to 18 by using a deep-learning neural network model. The terrain maps 105 to 108 contain terrain characteristic information identified from a series of image frames constituting the camera videos 15 to 18. At this time, the terrain maps 105 to 108 may contain terrain characteristic information for all or some of the image frames or terrain characteristic information for all or some of the video images.

In the invention, the deep-learning neural network processing unit includes a deep-learning neural network model unit 110 and an edge communication unit 120.

The deep-learning neural network model unit 110 has a pre-trained deep-learning neural network model to estimate terrain characteristic information for an image frame. The deep-learning neural network model unit 110 generates the plurality of terrain maps 105 to 108 having terrain characteristic information of corresponding camera videos 15 to 18 by the deep-learning neural network model when the plurality of camera videos 15 to 18 are received from the plurality of cameras 11 to 14. The deep-learning neural network model can estimate a terrain characteristic from one video image without a need to analyze a series of image frames, thus enabling a terrain characteristic to be estimated even in a state where a vehicle is stopped.

Machine learning training of the deep-learning neural network model is performed by the deep-learning neural network cloud unit 300, and the deep-learning neural network model is supplied to the deep-learning neural network model unit 110 from the deep-learning neural network cloud unit 300 through the edge communication unit 120. The deep-learning neural network model of the pre-trained deep-learning neural network model unit 110 enables terrain characteristic information to be estimated for a series of image frames constituting the camera videos 15 to 18. In this specification, a set of items of terrain characteristic information generated with respect to the camera videos 15 to 18 by the deep-learning neural network model unit 110 is referred to as 'terrain maps'.

Preferably, the deep-learning neural network model estimates terrain characteristics from the camera videos 15 to 18 on the basis of segmentation images. Here, segmented images used to estimate the terrain characteristics from the camera videos 15 to 18 are referred to as 'segmentation images' in this specification. The segmentation image is defined in a preset dataset.

The edge communication unit 120 interfaces between the deep-learning neural network model unit 110 and the deep-learning neural network cloud unit 300. In the invention, the deep-learning neural network model is provided at an edge, and the deep-learning neural network cloud unit 300 can provide information after training the deep-learning neural network model. First, the edge communication unit 120 downloads and receives, via a network, the deep-learning neural network model trained by the deep-learning neural network cloud unit 300 and transmits the deep-learning neural network model to the deep-learning neural network model unit 110. In addition, the edge communication unit 120 downloads and receives, via a network, terrain characteristic estimation information stored in an AI data center 310 of the deep-learning neural network cloud unit 300 and transmits the terrain characteristic estimation information to the deep-learning neural network model unit 110.

The 3D AVM video combining unit 200 receives the camera videos 15 to 18 in a plurality of directions of the vehicle from the plurality of cameras 11 to 14. The 3D AVM video combining unit 200 generates a 3D AVM video 209 by combining (stitching) these camera videos 15 to 18 using the terrain characteristic information of the terrain maps 105 to 108 and camera calibration information.

In the invention, a 3D projection plane does not have a preset shape (for example, a cylindrical or bowl shape), but the 3D projection plane is formed variably in real time on the basis of the terrain characteristic information of the terrain maps 105 to 108. In this respect, the 3D AVM video combining unit 200 receives the plurality of terrain maps 105 to 108 from the deep-learning neural network model unit 110 and generates an atypical 3D projection plane variably in real time for the plurality of camera videos 15 to 18 in response to the terrain characteristic information contained in the terrain maps 105 to 108. Then, the 3D AVM video combining unit 200 generates the 3D AVM video 209 by applying atypical projection to the plurality of camera videos 15 to 18 and performing the video combination.

In the invention, the 3D AVM video combining unit 200 includes a camera calibration processing unit 210 and a 3D projection plane shape processing unit 220.

The camera calibration processing unit 210 eliminates, from the plurality of camera videos 15 to 18, a distortion due to a camera lens and a distortion due to a camera mounting position and angle by using internal parameters and external parameters stored in advance for the plurality of cameras 11 to 14. This process is generally referred to as a distortion eliminating process using camera calibration information.

In general, a camera calibration step is performed after the front, rear, right, and left cameras 11 to 14 are installed in the vehicle to implement an AVM function. In the camera calibration step, an AVM system obtains internal parameters (intrinsic camera parameters) and external parameters (extrinsic camera parameters) for each camera installed in the vehicle, and the parameters are collectively referred to as camera calibration information. The internal parameter is information indicating a distortion characteristic due to a camera lens, and the external parameter is angle information about a spatial position at which a corresponding the camera is mounted on the vehicle and a virtual three-dimensional spatial axis.

Distortions depending on the internal parameters and external parameters of the cameras 11 to 14 are reflected in the camera videos 15 to 18 generated by the cameras 11 to 14. The camera calibration processing unit 210 of the 3D AVM video combining unit 200 performs a process of eliminating distortions depending on the internal parameters and external parameters, that is, distortions due to a camera lens and a camera mounting position and angle in a process of combining the camera videos 15 to 18. In general, the process of eliminating the distortions of the camera videos 15 to 18 using the camera calibration information is represented by Equation 1, and this is a known technology in the video combination field, so the detailed description thereof is omitted in this specification.

$$b = \begin{pmatrix} u \\ v \\ 1 \end{pmatrix} \sim \begin{pmatrix} f_x & 0 & c_x \\ 0 & f_y & c_y \\ 0 & 0 & 1 \end{pmatrix} \begin{pmatrix} r_{11} & r_{12} & r_{13} & t_1 \\ r_{21} & r_{22} & r_{23} & t_2 \\ r_{31} & r_{32} & r_{33} & t_3 \end{pmatrix} \begin{pmatrix} x \\ y \\ z \\ 1 \end{pmatrix}$$ [Equation 1]

The two matrices $$\begin{pmatrix} f_x & 0 & c_x \\ 0 & f_y & c_y \\ 0 & 0 & 1 \end{pmatrix} \text{ and } \begin{pmatrix} r_{11} & r_{12} & r_{13} & t_1 \\ r_{21} & r_{22} & r_{23} & t_2 \\ r_{31} & r_{32} & r_{33} & t_3 \end{pmatrix}$$

represent the internal camera parameters and the external camera parameters, respectively.

The 3D projection plane shape processing unit 220 forms a 3D projection plane shape reflecting the terrain characteristic information for the plurality of images 15 to 18 by using the plurality of terrain maps 105 to 108 received from the deep-learning neural network model unit 110. In other words, characteristics of the segmentation images are found from the camera videos 15 to 18 generated by the cameras 11 to 14 attached to the vehicle, and the terrain maps 105 to 108 are made based on the characteristics to set the 3D projection plane. Hence, the 3D projection plane does not have a standardized shape such as a cylindrical or bowl shape, but has an atypical shape depending on the information in the segmentation images. The 3D projection plane shape generated by the 3D projection plane shape processing unit 220 is provided to the 3D AVM video combining unit 200 and is used as a 3D projection plane on which the plurality of camera videos 15 to 18 are projected in a video combining process.

Specifically, the 3D AVM video combining unit 200 reflects the terrain characteristic information for each unit image stored in the plurality terrain maps 105 to 108 corresponding to the corresponding image frames of the plurality of camera videos 15 to 18 to set a 3D projection plane having an atypical shape and projects the plurality of camera videos 15 to 18 on the 3D projection plane having the atypical shape.

In a 3D AVM system in the related art, camera videos 15 to 18 are regularly projected on a 3D projection plane having a preset shape (for example, a bowl or cylindrical shape), and thus a terrain distortion appears in a 3D AVM video. Meanwhile, in the invention, a 3D projection plane shape can be generated and applied according to the terrain characteristics as necessary, and thereby a 3D AVM video without a distortion of the surrounding terrain can be obtained. In the invention, the segmentation images obtained from the camera videos 15 to 18 are input into the deep-learning neural network model to estimate terrain characteristics of the corresponding videos, a 3D terrain map is made on the basis of the estimated information, and then a 3D projection plane shape is generated on the basis of the 3D terrain map and is used.

The deep-learning neural network cloud unit 300 is trained in the deep-learning neural network model through machine learning to estimate terrain characteristic information for the image frames by using a pre-provided training dataset 320. In the invention, the training dataset 320 for the deep-learning neural network model can include multiple combinations of training camera images 321 and training terrain characteristic information 322.

Figure 5:
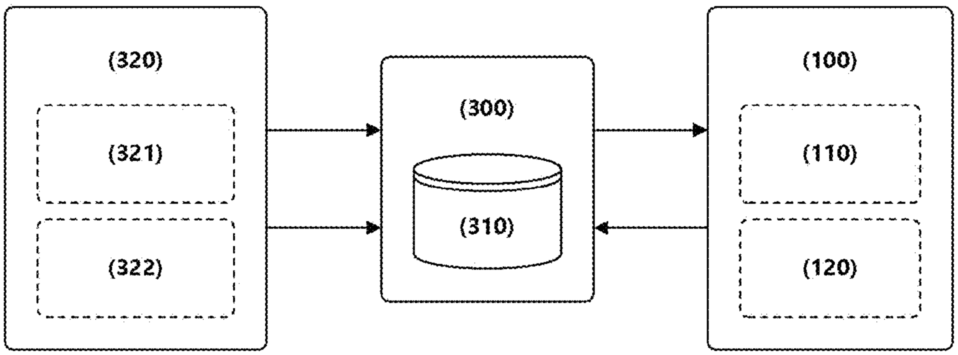
FIG. 5 is a block diagram of a configuration for training a deep-learning neural network model in the invention.

FIG. 5 is a block diagram of a configuration in which the deep-learning neural network cloud unit 300 in the invention is trained in the deep-learning neural network model through machine learning.

The deep-learning neural network model estimates terrain characteristic information from the camera videos 15 to 18. In order to use the deep-learning neural network model in this way, the deep-learning neural network cloud unit 300 needs to be trained in the deep-learning neural network model of the deep-learning neural network model unit 110 in advance. In the deep learning, a training process is referred to as a process of machine learning training a neural network model through a training dataset.

As one embodiment, a large set of training camera images 321 may constitute the training datasets 320 for the deep-learning neural network model. The deep-learning neural network cloud unit 300 can be configured to perform unsupervised learning of the deep-learning neural network model by using multiple combinations of front, rear, right, and left camera images. The deep-learning neural network model sufficiently trained through machine learning with a large number of front, rear, right, and left camera images may estimate terrain characteristic information from the camera videos 15 to 18.

As another embodiment, multiple combinations of the training camera images 321 and the training terrain characteristic information 322 may constitute the training datasets 320 for the deep-learning neural network model. The deep-learning neural network cloud unit 300 can be configured to perform supervised learning of the deep-learning neural network model with multiple combinations of the training camera images 321 and the training terrain characteristic information 322. As described above, a deep-learning neural network model sufficiently trained through machine learning may estimate terrain characteristic information from the camera videos 15 to 18.

The deep-learning neural network cloud unit 300 stores, in the AI data center 310, information of the deep-learning neural network model trained through machine learning. When a request from the edge communication unit 120 is received via a network, the deep-learning neural network cloud unit 300 supplies information of the deep-learning neural network model to the deep-learning neural network processing unit 100.

Figure 6:
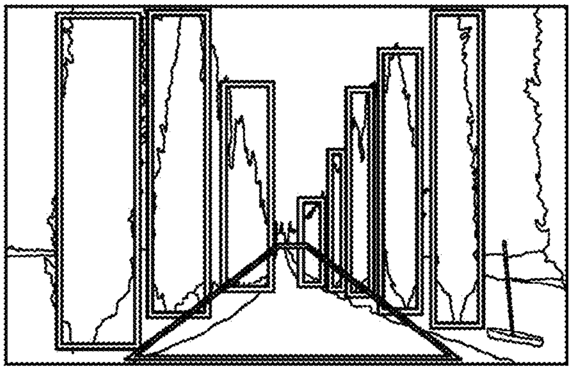
FIG. 6 is an illustrative view of terrain characteristic information based on a segmentation image in the invention.
Figure 6:
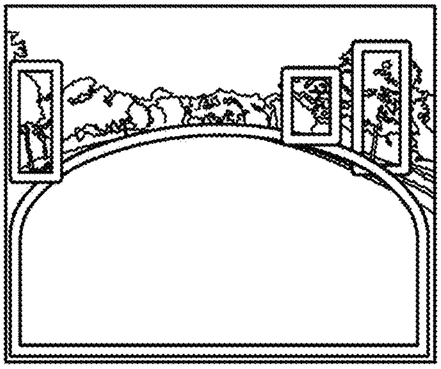
Figure 6:
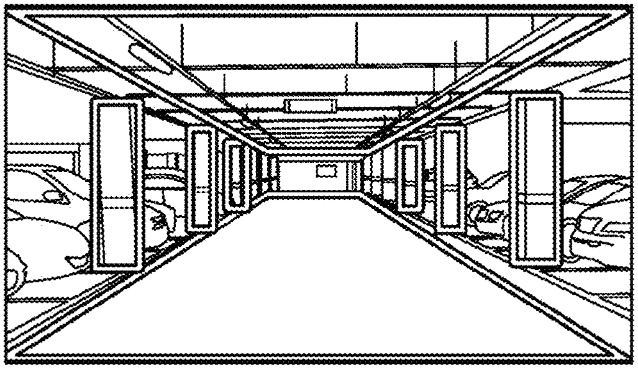

In the invention, it is desirable that the training and estimation of the terrain characteristic information in the deep-learning neural network model be performed on the basis of the segmentation images. FIG. 6 is an illustrative view of the terrain characteristic information based on the segmentation images in the invention. This terrain characteristic information can be used in the machine learning training of deep-learning neural network models. In addition, in a case where the segmentation images as illustrated in FIG. 6 are included in the image frames of the camera videos 15 to 18, the deep-learning neural network model estimates terrain characteristic information corresponding to the videos.

In the invention, the deep-learning neural network processing unit and the deep-learning neural network cloud unit 300 can be configured to operate in cooperation in real time. In 5G mobile communication, not only a communication speed is high, but also a real-time response time can be guaranteed, so it is possible to link the deep-learning neural network processing unit and the deep-learning neural network cloud unit 300 in real time. This configuration is particularly useful in situations where the deep-learning neural network model unit 110 is unable to output terrain characteristic information.

At this time, the deep-learning neural network model unit 110 transmits the plurality of camera videos 15 to 18 to the deep-learning neural network cloud unit 300 and requests the estimation of the terrain characteristic information thereof. When receiving the plurality of camera videos 15 to 18 from the deep-learning neural network model unit 110, the deep-learning neural network cloud unit 300 estimates, in real time, terrain characteristic information of the camera videos 15 to 18 received by the deep-learning neural network model stored in the AI data center 310 and transmits the terrain characteristic information to the deep-learning neural network model unit 110. The edge communication unit 120 plays a role of a real-time medium of transmission and reception of the plurality of camera videos 15 to 18 and the terrain characteristic information between the deep-learning neural network model unit 110 and the deep-learning neural network cloud unit 300.

Meanwhile, the invention can employ a configuration for improving a speed of generating a 3D AVM video.

In the related art, when the camera videos 15 to 18 are projected regularly on a fixed 3D projection plane, a projection processing time is constant because the videos and the projection plane have certain rules and are repeatedly projected. However, as in the invention, when the terrain characteristic information is obtained to generate terrain maps 105 to 108 and the camera videos 15 to 18 are combined accordingly, the projection processing time can be prolonged because the projection plane shape must be dynamically generated and transformed in real time. This has a disadvantage of degrading the quality of the 3D AVM videos.

In order to overcome this, in the invention, the 3D projection plane shape processing unit 220 of the 3D AVM video combining unit 200 can be configured to store, in the internal storage device, the terrain shape data on the basis of the terrain maps 105 to 108 trained by the deep-learning neural network cloud unit 300 to reduce a projection plane shape generation time, and to load and use these data when the projection plane shape needs to be generated.

The invention has an advantage of enhancing the convenience of driving a vehicle by forming a 3D AVM image plane from which a terrain distortion is eliminated.

While the present invention has been described with respect to the specific embodiments, it will be apparent to those skilled in the art that various changes and modifications may be made without departing from the spirit and scope of the invention as defined in the following claims.

What is claimed is:

1. A variable-type three-dimensional (3D) around-view monitoring (AVM) system by use of deep learning in an edge-cloud environment which variably generates a 3D AVM video by estimating a terrain characteristic from a plurality of camera videos through a real-time cooperative operation of a deep-learning neural network processing unit inside a vehicle and a deep-learning neural network cloud unit outside the vehicle in the edge-cloud environment, the variable-type 3D AVM system comprising:

an edge communication unit configured to provide the real-time cooperative operation via a network between the deep-learning neural network processing unit inside the vehicle and the deep-learning neural network cloud unit outside the vehicle;

a plurality of cameras installed in the vehicle in different directions to generate plurality of camera videos;

deep-learning neural network processing unit inside the vehicle, comprising a pre-trained deep-learning neural network model configured to estimate terrain characteristic information for image frame based on a plurality of segmentation images wherein the deep-learning neural network processing unit is configured to:

generate a plurality of terrain maps containing the terrain characteristic information derived from the plurality of camera videos using pre-trained deep-learning neural network model; and when unable to output the terrain characteristic information by the pre-trained deep-learning neural network model, transmit the plurality of camera videos to the deep-learning neural network cloud unit outside the vehicle via the edge communication unit and request estimation of the terrain characteristic information of the plurality of camera videos for the real-time cooperative operation;

the deep-learning neural network cloud unit outside the vehicle configured to:

train the deep-learning neural network model through machine learning to estimate the terrain characteristic information based on the plurality of segmentation images by using a preconfigured training dataset including multiple combinations of training camera images and training terrain characteristic information;

store the trained deep-learning neural network model in an artificial intelligence (AI) data center;

transmit information of the trained deep-learning neural network model stored in the AI data center to the deep-learning neural network processing unit when a request is received from the edge communication unit; and estimate, in real time, the terrain characteristic information of the plurality of camera videos using the trained deep-learning neural network model stored in the AI data center upon receiving the plurality of camera videos from the deep-learning neural network processing unit, and transmit the estimated terrain characteristic information to the deep-learning neural network processing unit to execute the real-time cooperative operation; and a 3D AVM video combining unit configured to:

receive the plurality of camera videos from the plurality of cameras;

receive the plurality of terrain maps from the deep-learning neural network processing unit;

form, in real time, a 3D projection plane having a shape dynamically configured to reflect structural terrain features defined in the terrain maps that correspond to the plurality of segmentation images;

generate a 3D AVM video by performing projection of the plurality of camera videos on the 3D projection plane having the dynamically configured shape and performing video combination of the projected camera videos;

store, in an inner storage device, terrain shape data derived from the terrain maps generated by the deep-learning neural network model trained by the deep-learning neural network cloud unit; and load and use the terrain shape data from the inner storage device when forming the 3D projection plane having the dynamically configured shape.

2. The variable-type 3D AVM system by use of deep learning according to claim 1, wherein the 3D AVM video combining unit sets the 3D projection plane having the dynamically configured shape by reflecting terrain characteristic information for each unit image stored in the plurality of terrain maps corresponding to the image frames of the plurality of camera videos and projects the plurality of camera videos on the 3D projection plane having the dynamically configured shape.

3. The variable-type 3D AVM system by use of deep learning according to claim 1, wherein the 3D AVM video combining unit further includes a camera calibration processing unit that eliminates, from the plurality of camera videos, a distortion due to a camera lens and a distortion due to a camera mounting position and angle by using internal parameters and external parameters stored in advance for the plurality of cameras.

* * * * *